US007623858B2

(12) United States Patent
Johnston, Jr.

(10) Patent No.: US 7,623,858 B2
(45) Date of Patent: Nov. 24, 2009

(54) SYSTEM AND METHODS OF INTEGRATING AN OVERLAY WIRELESS DATA NETWORK BLANKET INTO A HIGH BANDWIDTH FTTX (FIBER-TO-THE-PREMISES/CURB/NEIGHBORHOOD) NETWORK

(76) Inventor: Ernest Burns Johnston, Jr., 485 Bruce Way, SW., Lilburn, GA (US) 30047-3025

( * ) Notice: Subject to any disclaimer, the term of this patent is extended or adjusted under 35 U.S.C. 154(b) by 449 days.

(21) Appl. No.: 11/456,768

(22) Filed: Jul. 11, 2006

(65) Prior Publication Data
US 2008/0014932 A1    Jan. 17, 2008

(51) Int. Cl.
*H04Q 7/20* (2006.01)
(52) U.S. Cl. .............. 455/426.1; 455/422.1; 455/403; 370/539; 398/66
(58) Field of Classification Search .............. 455/426.2, 455/426.1, 402, 403, 422.1; 370/338, 539; 359/172; 398/66
See application file for complete search history.

(56) References Cited

U.S. PATENT DOCUMENTS

| 2002/0171897 | A1* | 11/2002 | Cho et al. ................ 359/172 |
| 2005/0113120 | A1* | 5/2005 | Rappaport et al. .......... 455/500 |
| 2005/0195862 | A1* | 9/2005 | Jones et al. ................ 370/503 |
| 2005/0271020 | A1* | 12/2005 | Thermond .................. 370/338 |
| 2006/0198380 | A1* | 9/2006 | Sharp ........................ 370/400 |

* cited by examiner

*Primary Examiner*—Danh C Le
(74) *Attorney, Agent, or Firm*—Crose Law LLC; Bradley D. Crose

(57) ABSTRACT

An approach to integrate a wireless data network blanket into the high-capacity fixed FttX (Fiber-to-the-Premises/Curb/Neighborhood) network at intersection points throughout the overlay rather than interconnecting them as two disparate networks in order to provide a plurality of data containing video, audio, voice communications, broadcast radio programming, and data both fixed and mobile. This approach is applicable to PON (Passive Optical Networks) and active networks alike, though the implementations vary slightly. Considerations must still be made for security.

8 Claims, 3 Drawing Sheets

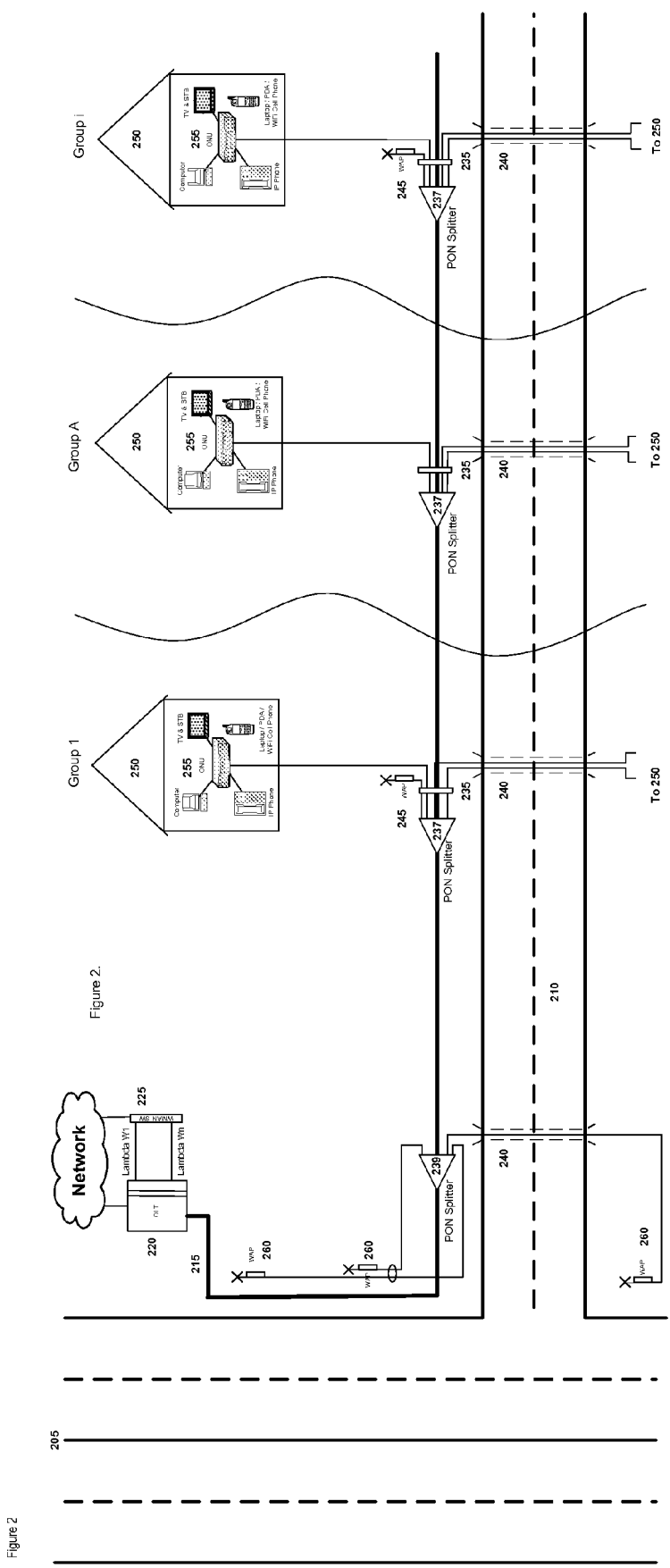

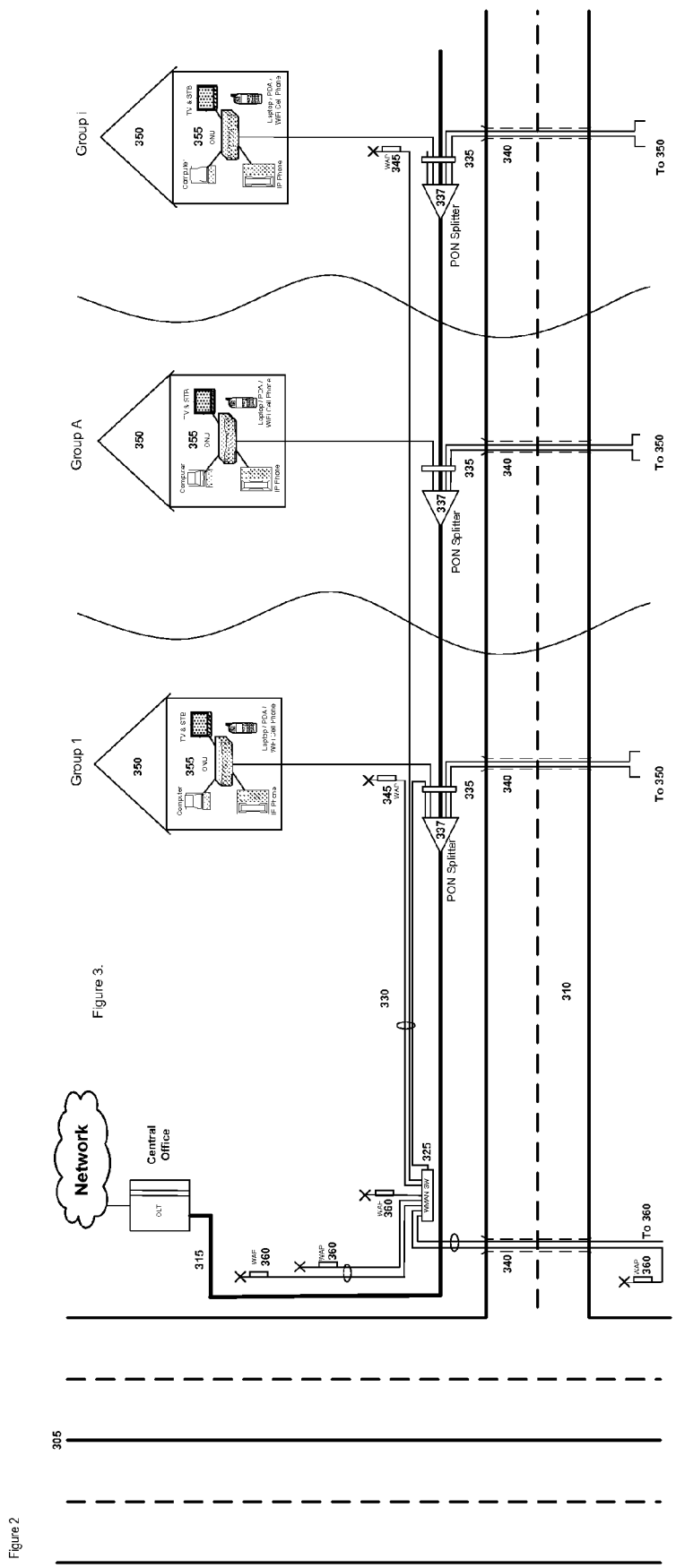

SYSTEM AND METHODS OF INTEGRATING AN OVERLAY WIRELESS DATA NETWORK BLANKET INTO A HIGH BANDWIDTH FTTX (FIBER-TO-THE-PREMISES/CURB/NEIGHBORHOOD) NETWORK

BACKGROUND OF THE INVENTION

Current practice is to design and deploy separate fixed communication and wireless telephone (e.g. cellular with data, 2.5 & 3G or Generation) or data-only (e.g. Wi-Fi) networks and then offer similar services such as telephony, internet access and steaming video over each. These two (2) separate networks are then linked by a private connection or over the Internet. A simpler (i.e. cleaner, less complicated, more reliable) approach is to integrate this wireless connection into the high-capacity fixed network at intersection points through out the overlay rather than interconnecting them as two disparate networks.

BRIEF SUMMARY OF THE INVENTION

This method of delivering low and high bandwidth mobile network applications encompassing VAD (Video, Audio including telephony or radio and Data) takes advantage of the co-located fixed network which is already in place or is being installed, as a backbone to deliver these same services wirelessly. One efficient method of providing high bandwidth mobile services (e.g. streaming video, VOD, Video On Demand, and RAD, Radio On Demand) is through the use of relatively low powered microcells such as those used in commercially available IEEE standard 802.11 a/b/g/n (Wi-Fi) or 802.16 (Wi-Max) data networks (which can also be used for determining location without need of GPS, Global Positioning System) connected in an overlapping manner as to form a blanket (contiguous domes or bubbles) of coverage along traffic ways. Exact implementations could change as technologies evolve.

The utility is the underlying multimedia high capacity network available to the users wirelessly and mobile, subject only to the limitations of the wireless technology implemented at a particular node. Use of IPv6 will leverage its inherent QoS (Quality Of Service) and mobility features.

Other patents have described applications using currently implemented technologies, which require service(s) to be delivered to the premises. This system describes co-locating contiguous wireless data Points Of Presence (WAPs) along the route(s) as the conductors are implemented, either aerial or buried, for new high bandwidth communications networks. The services provided can be linked to those delivered to the fixed network users.

BRIEF DESCRIPTION OF THE SEVERAL VIEWS OF THE DRAWING

FIG. 2 illustrates a PON (Passive Optical Network) implementation where each WAP (Wireless Access Point) has its own wavelength (lambda) circuit back to the WMAN Switch at the CO (Central Office).

FIG. 3 details a PON system which uses just one of the light wavelengths to carry all of the wireless traffic between the WMAN Switch and the CO with P-t-P (Point-To-Point) links between the switch and the WAPs.

DETAILED DESCRIPTION OF THE INVENTION

Figure 1:
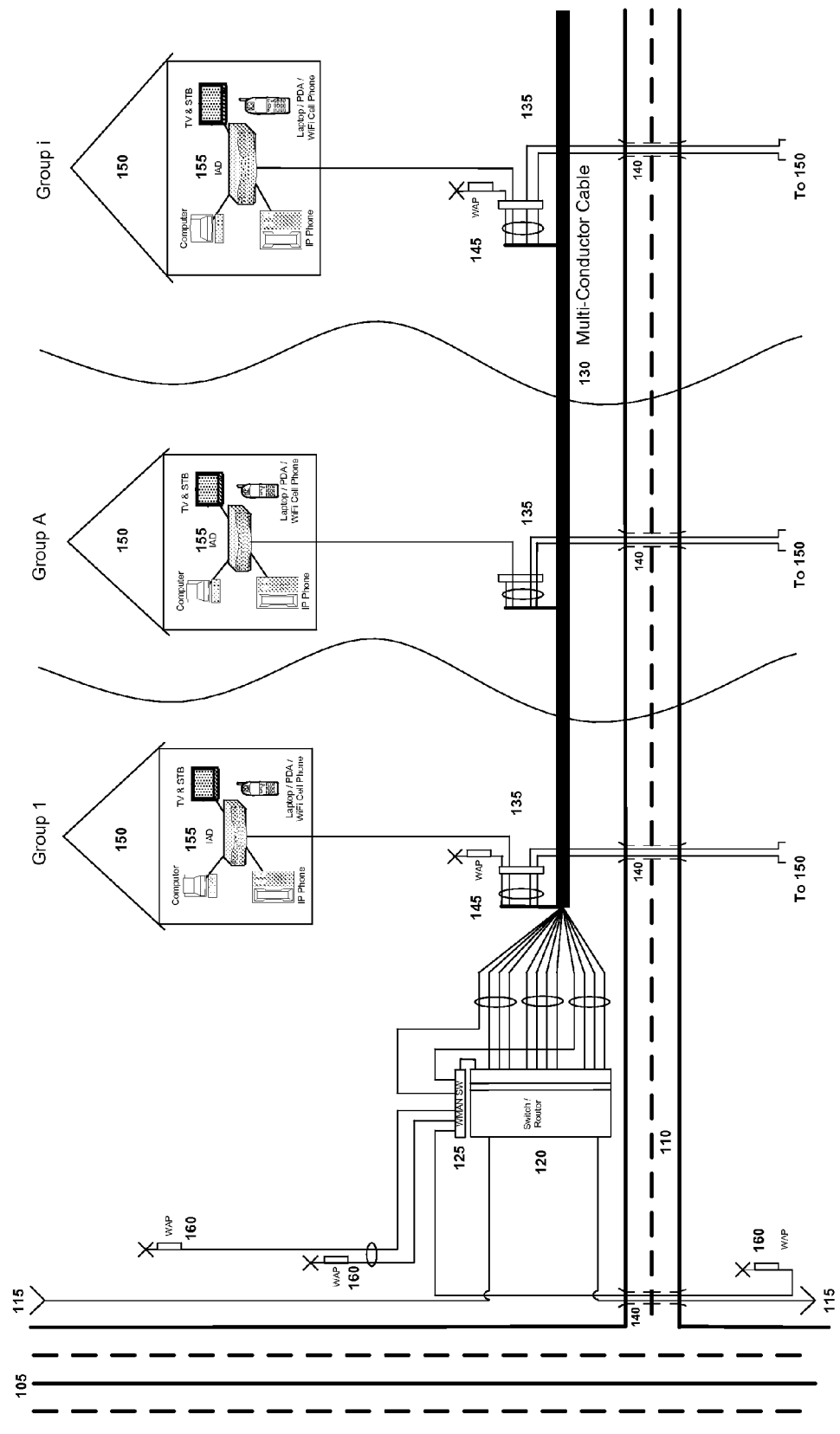
FIG. 1 shows an active network implementation using multi-conductor cable which will probably but not necessarily be buried to carry signals from both the router/switch and the WMAN Switch (Wireless Metropolitan Area Network Switch, similar to a WLAN, Wireless Local Area Network switch).

Interconnection of a wireless data network, which may also carry video and voice, to a metropolitan area network (MAN) is most effectively done in an integrated fashion by merging the two networks.

FIG. 1 shows the active implementation of the invention. Information is delivered to a neighborhood network router/switch 120 from a high-capacity circuit 115 along a major traffic-way 105, possibly connected in a ring configuration. From this point a multi-conductor cable 130 distributes the data into the neighborhood with breakout points 135 for clusters of premises 150 (homes and/or businesses). From this cable hub 135 single cables are delivered to individual locations 150, however those crossing under a traffic-way 110 may share a single tunnel or conduit 140.

At this hub 135, a WAP 145 may be installed as needed for mobile coverage depending on the proximity of the next hub 135 and the range of the wireless equipment. The conductor attached to the WAP 145 returns to the location of the router/switch 120 where it is connected instead to a WMAN Switch 125 that is in turn linked to the router/switch 120. Alternatively the WMAN Switch 125 may at some time be built into the router/switch 120.

The other conductors broken out in the cable hub 135 connect over single cables to IADs (Integrated Access Device) 155 within the premises 150. Attached to the IAD through "home-run" cables are computers, phones, gaming systems, TV/STBs (Set Top Boxes, which may be built in), etc. The consumer may also attach their own local WAP for wireless connectivity to various devices within the premises, or may rely on the strength of the curbside WAP 145 and associated security.

At implementation, as the feeder cable is being placed along the major traffic-way 105 to or from the router/switch 120, additional cables are brought with it from the WMAN Switch 125 to WAPs 160 spaced along this route 105 as to provide continuous wireless coverage from neighborhood to neighborhood.

FIG. 2 shows the PON implementation where the WMAN Switch has been located at the serving central office. Information from the OLT (Optical Line Terminal) is delivered through a high-capacity circuit 215 along a major traffic-way 205, to PON (Passive Optical Network) Splitters 237 which distribute the data into the neighborhood at breakout points 235 for clusters of premises 250 (homes and/or businesses). From this cable hub 235, single wavelengths are separated and delivered to ONU (Optical Network Units) 255 at individual locations 250; however those crossing under a traffic-way 210 may share a single tunnel or conduit 240.

At the hub 235/splitter 237, a WAP 245 may be installed as needed for mobile coverage depending on the proximity of the next hub 235 and the range of the wireless equipment. The wavelength attached to the WAP 245 returns to the Central Office 220 where it is connected instead to a WMAN Switch 225 that is in turn linked to the network. A similar approach is possible with cable modems.

Attached to the premises ONU 255 through "home-run" cables are computers, phones, gaming systems, TV/STBs (Set Top Boxes, which may be built in), etc. The consumer may also attach their own local WAP for wireless connectivity to various devices within the premises, or may rely on the strength of the curbside WAP 245 and associated security.

At implementation, as the feeder cable 215 is being placed along the major traffic-way 205 to or from the Central Office, additional wavelengths are brought with it from the WMAN Switch 225 to a PON Splitter 239 that feeds WAPs 260 spaced along this route 205 as to provide continuous wireless coverage from neighborhood to neighborhood.

FIG. 3 shows the PON implementation with collocated WMAN Switch. Information from the OLT (Optical Line Terminal) is delivered through a high-capacity circuit 315 along a major traffic-way 305, to PON (Passive Optical Network) Splitters 337 which distribute the data into the neighborhood at breakout points 335 for clusters of premises 350 (homes and/or businesses). From this cable hub 335, single wavelengths are separated and delivered to ONU (Optical Network Units) 355 at individual locations 350; however those crossing under a traffic-way 310 may share a single tunnel or conduit 340.

Attached to the premises ONU though "home-run" cables are computers, phones, gaming systems, TV/STBs (Set Top Boxes, which may be built in), etc. The consumer may also attach their own local WAP for wireless connectivity to various devices within the premises, or may rely on the strength of the curbside WAP 345 and associated security.

At some hub 335/splitter 337 locations, one wavelength is fed to a WMAN Switch 325 located near one WAP 345 and from which individual P-t-P (Point-To-Point) circuits 340 feed additional WAPs 345 that may be installed as needed for mobile coverage, depending on the proximity of the next hub 335 and the range of the wireless equipment. These P-t-P circuits 340 should be installed at the same time the PON distribution conductors are placed.

At implementation, as the feeder cable 315 is being placed along the major traffic-way 305 to or from the Central Office, additional conductors are brought with it from a local WMAN Switch 325 to feed WAPs 360 spaced along this route 305 as to provide continuous wireless coverage from neighborhood to neighborhood.

While in range, dual-mode phones and other wireless devices off-load the cellular network onto the WMAN freeing precious and more expensive WWAN (Wireless Wide Area Network, cellular) bandwidth. This is especially attractive as the WMAN is a high capacity wireless data network repeated every few hundred feet or so, allowing for a myriad of services. Once out of range of the wireless data network footprint, coverage reverts to the cellular voice and data network.

This wireless blanket is also useful for utility (electric, gas or water, etc) monitoring and control telemetry without costly and complicated cable installations. Other types are envisioned and encouraged.

What is claimed is:

1. An integrated fixed and mobile communications system, the system comprising:
    at least one passive optical network (PON) optical line terminal (OLT) located at a central office, the PON configured to aggregate a plurality of data to and from at least one premises along a vehicular/pedestrian traffic way and served by the central office;
    at least one PON splitter located along the traffic way to receive from and send to the OLT, the plurality of data and configured to control the flow of the plurality of data to and from at least one premises located along the traffic way which is connected to one of the PON splitters, if a subscriber, and
    a plurality of fiber optic distribution cables to deliver information to and retrieve from the at least one PON splitter; and
    wherein the at least one WAP is configured to communicate the plurality of data to and from any of a plurality of wireless devices located proximate to the traffic way;
    wherein the at least one WAP is placed as necessary proximate to a breakout point of the at least one PON splitter where at least one drop cable to the premises emanates, such that a first coverage area and a second coverage area abut or overlap in such a manner that there is no loss of communications to the mobile devices as they move along the traffic way, and wherein the at least one WAP also connects to a WMAN controller/switch;
    wherein the at least one WAP is placed along a major traffic way as the plurality of data is delivered between the at least one PON splitter and the OLT such that a first coverage area and a second coverage area abut or overlap in such a manner that there is no loss of communications to the mobile devices as they move along the major traffic way, and wherein the at least one WAP also connects to a WMAN controller/switch; and
    wherein the integrated fixed and mobile communications system is proximate to the vehicular/pedestrian traffic way, utilized with a very high speed and capacity fiber-to-the-premises/curb/neighborhood (FttX) packet data-only network to enable communications between a plurality of mobile devices and the FttX network, and configured to provide a plurality of data containing video, audio, voice communications, broadcast radio programming, and data.

2. The integrated fixed and mobile communications system of claim 1, wherein the WMAN controller/switch is located proximate to the OLT to control the flow of the plurality of data between the OLT and at least one or more WAPs and coordinates the transition of mobile device communications from at least a first WAP to a second WAP, and wherein the OLT is configured to segregate light wavelengths used for the at least one WAP, and to deliver the wavelengths to the WMAN controller/switch.

3. The integrated fixed and mobile communications system of claim 2, wherein the at least one WAP is connected by the PON network that carries said information between the OLT and the premises located along the traffic way, through the OLT to the WMAN controller/switch.

4. The integrated fixed and mobile communications system of claim 1, wherein the WMAN controller/switch is located proximate to a PON splitter along a traffic way to control the flow of the plurality of data between the PON splitter and at least one or more WAPs and coordinates the transition of mobile device communications from at least a first WAP to a second WAP, and wherein the WMAN controller/switch is connected to at least one WAP by a means of direct conductors.

5. A method for integrated fixed and mobile communications, the method comprising:
    utilizing an integrated fixed and mobile communications comprising:
        at least one passive optical network (PON) optical line terminal (OLT) located at a central office, the PON configured to aggregate a plurality of data to and from at least one premises along a vehicular/pedestrian traffic way and served by the central office;
        at least one PON splitter located along the traffic way to receive from and send to the OLT, the plurality of data and configured to control the flow of the plurality of data to and from at least one premises located along the traffic way, if a subscriber; and a plurality of fiber optic distribution cables to deliver information between the at least one PON splitter and the OLT;

placing the integrated fixed and mobile communications system proximate to the vehicular/pedestrian traffic way; and configuring the at least one WAP to communicate the plurality of data to and from any of a plurality of wireless devices located proximate to the traffic way;

placing, as necessary, at least one WAP proximate to a breakout point of the at least one PON splitter where at least one drop cable to the premises emanates, such that a first coverage area and a second coverage area abut or overlap in such a manner that there is no loss of communications to the mobile devices as they move along the traffic way, and wherein the at least one WAP also connects to a WMAN controller/switch;

placing at least one WAP along a major traffic way as the plurality of data is delivered between the at least one PON splitter and the OLT such that a first coverage area and a second coverage area abut or overlap in such a manner that there is no loss of communications to the mobile devices as they move along the major traffic way, and wherein the at least one WAP also connects to the WMAN controller/switch; and utilizing the integrated fixed and mobile communications system in a very high speed and capacity fiber-to-the-premises/curb/neighborhood (FttX) packet data-only network to enable communications between a plurality of mobile devices and the FttX network, and configured to provide a plurality of data containing video, audio, voice communications, broadcast radio programming, and data.

6. The method for integrated fixed and mobile communications of claim 5, further comprising:

locating the WMAN controller/switch proximate to the OLT to control the flow of the plurality of data between the OLT and at least one or more WAPs, and wherein the WMAN controller/switch coordinates the transition of mobile device communications from at least a first WAP to a second WAP, and configuring the OLT to segregate light wavelengths used for the at least one WAP, and to deliver the wavelengths to the WMAN controller/switch.

7. The method for integrated fixed and mobile communications of claim 5, further comprising:

connecting at least one WAP by the PON network that carries said information between the OLT and the premises located along the traffic way, to the WMAN controller/switch.

8. The method for connecting the at least one WAP in claim 5, wherein the WMAN controller/switch is located proximate to a PON splitter along a traffic way to control the flow of the plurality of data between the PON splitter and at least one or more WAPs and coordinates the transition of mobile device communications from at least a first WAP to a second WAP, and wherein the WMAN controller/switch is connected to at least one WAP by a means of direct conductors.

* * * * *